United States Patent Office 2,994,499
Patented Aug. 1, 1961

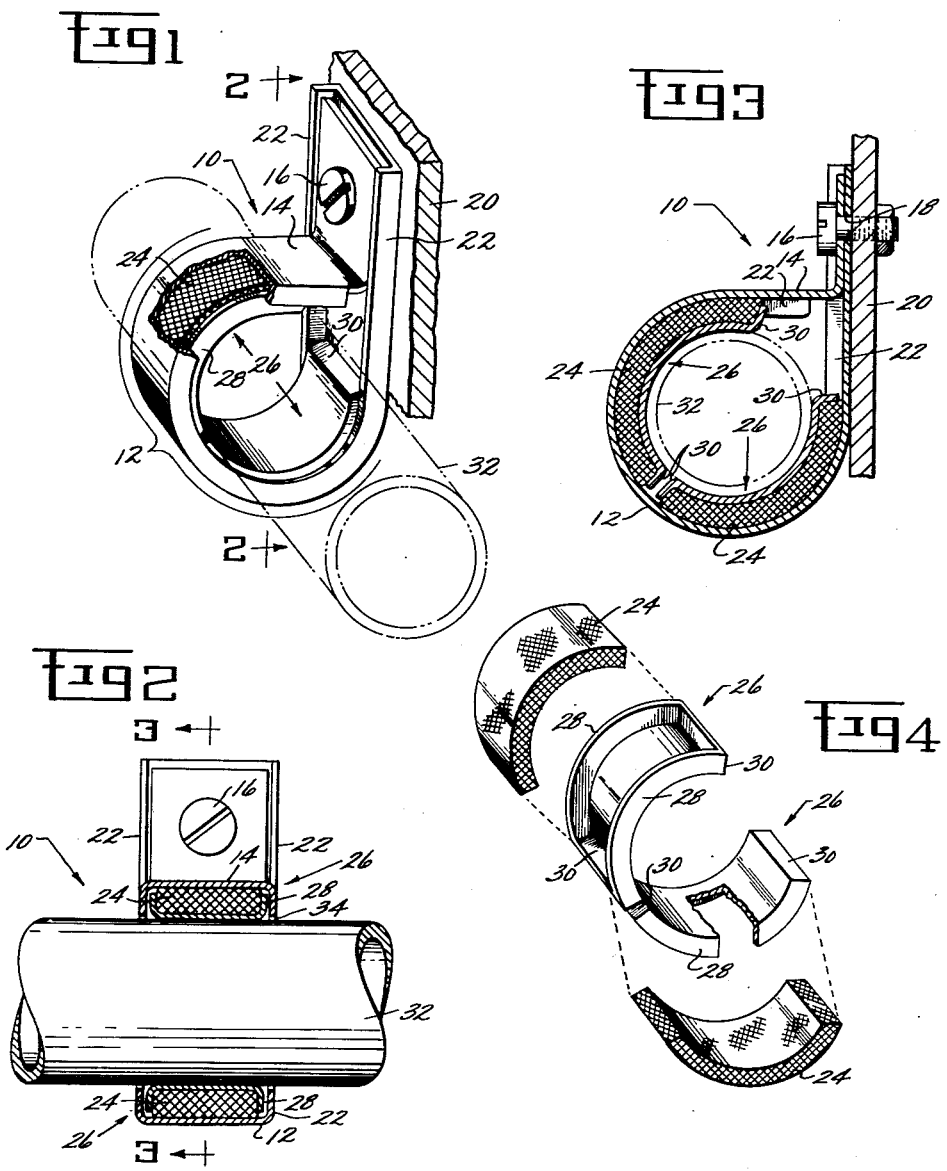

2,994,499
CONDUIT CLAMP
Everett W. Waters, Cincinnati, Ohio, assignor to General Electric Company, a corporation of New York
Filed Dec. 21, 1959, Ser. No. 860,915
6 Claims. (Cl. 248—74)

This invention relates to a conduit clamp and, more particularly, to a clamp capable of longer usage due to improved resistance to vibration and heat.

One form of support for a conduit employed, for example, to carry hydraulic fluid or fuel in equipment such as aircraft, is a clip or clamp having a metal strap adapted to encircle the conduit, the strap being attachable to a near-by frame or wall member in the equipment. In such applications the conduit and the clamp are often subject to sudden shocks or continuous vibration during operation of the equipment. It is therefore desirable that means be provided to insure that the clamp will be able to withstand these continuous or sudden stresses. It is also important to insure that the clamp will not gouge or wear the surface of the conduit, particularly if the conduit is constructed of a relatively soft material such as aluminum or plastic. To these ends various clamps have been devised which have resilient rubber or synthetic liners adapted to embrace the conduits to cushion the shocks.

One of the problems involved with the use of such resilient liner materials, however, is that continued vibration often tends to cause the material to break down or fatigue and thus slip out from between the conduit and the encircling strap. In particular, where excessive clamping pressure is required to securely fasten the conduits, the resilient material may permanently distort or deform, i.e., take a "set." When this occurs the conduit may become subject to increasing vibration, even to the point of resonating with other parts of the system. In addition, some of these rubber-like liner materials suffer from being subject to disintegration by the material used to bond them to the strap, and others present fire hazards by being unable to withstand high temperature or dissipate heat.

To overcome these deficiencies, use of metallic braid or mesh in constructing clamp liners has been suggested. These metallic liners have the further advantage of acting as a ground to prevent a static potential from building up between the conduit and its surrounding frame members. However, the metallic liners also suffer from the tendency to permanently distort or deform through continued exposure to vibration and high temperature operation.

Accordingly, an object of this invention is to provide an improved shock-resistant conduit clamp adapted to absorb vibration and dissipate heat.

A further object of this invention is to provide means for use with a metallic liner in a shock-resistant conduit clamp which will resist any tendency for the liner to permanently distort or deform due to prolonged exposure to vibration and high temperature.

Briefly, in one embodiment of my invention, I provide an improved shock-resistant conduit clamp including an arcuate metal strap of channeled cross-section, having a pair of inwardly-directed flanges at the edges thereof, means to attach the strap to a support, a vibration-resistant, heat-dissipating metallic liner on the inside of said strap, and conduit-gripping means adapted to combine with the strap to form a retainer for the liner.

While the specification concludes with claims particularly pointing out and distinctly claiming the subject matter of my invention, it is believed the invention will be better understood and other objects and advantages become more apparent from the following description and accompanying drawings in which:

FIG. 1 is a pictorial view, partially cut away to show the metallic cushion or liner; and FIG. 2 is a side elevation taken along line 2—2 of FIG. 1 illustrating the relative positions of the strap, liner, and conduit-gripping means when the clamp is fastened about a conduit; and FIG. 3 is an end view taken along line 3—3 of FIG. 2, illustrating the manner in which the liner is retained by the strap and conduit-gripping means; and FIG. 4 is an exploded view of a clamp embodiment having a pair of cushions adapted to be received in a pair of conduit-gripping means.

Referring now to FIG. 1, illustrated generally at 10 is a bendable metal strap which forms the main structural member of my novel clamp. The strap includes an arcuate intermediate portion 12 and a pair of end portions 14—14 extending generally tangentially therefrom. One of the end portions is bent at right angles to abut the other end portion in an overlying relationship. A suitable fastening, such as a screw 16, is adapted to pass through an aperture 18, shown in FIG. 3, in each end portion, the apertures being placed in alignment to enable the strap to be securely fastened to a support 20.

It will be seen from the drawings that the strap 10 includes a pair of inwardly-directed flanges 22—22 at either edge thereof which give the strap a channeled cross-section. These marginal flanges are generally coextensive with the intermediate arcuate portion of the strap with one flange being cut away to allow one of the end portions of the strap to overlay the other.

The vibration-resistant, heat dissipating feature of my novel clamp is provided by a resilient metallic liner or cushion adapted to fit inside the inwardly-directed flanges 22—22 of the metal strap. In the embodiment shown in the drawings, the liner comprises two cushions 24—24, generally rectangular in cross-section. The cushions may consist of a metal braid or mesh having a predetermined resiliency and thickness, or they may be premolded or precast from a porous metal having the ductility and resiliency of braid or mesh. In the latter instance, the cushions may be constructed using the so-called "metallic foam" materials. In any event, the cushions will absorb any vibration that the clamp may be subject to and, because of their porosity, dissipate heat which may be conducted through the walls of the conduit.

To enable the clamp to securely grip and retain the conduit yet prevent permanent distortion and deformation of the resilient liner, I have provided unique conduit-gripping means which are adapted to combine with the strap to accomplish the desired result. In the embodiment shown, the conduit-gripping means comprise a pair of box-like concave members, indicated generally at 26—26, adapted to fit inside the strap. The members are rectangular or channeled in cross-section, having outwardly-directed sides 28—28 and end-walls 30—30. The box-like members open outwardly to enable them to receive the resilient cushions, as can best be seen in the exploded view of FIG. 4.

By referring specifically to FIG. 2, it can be seen that with a conduit 32 tightly held in the clamp, there are gaps 34—34 between the innermost edges of each of the inwardly-directed strap flanges 22—22 and the surface of the conduit. The amount of this gap is predetermined by insuring that the cushions have a certain size and compressibility, the cushions being prevented from spreading out from under the strap by reason of the conduit-gripping means 26—26 combining with the strap to form a box-like retainer for the cushions. In other words, the outwardly-directed sides 28—28 and end-walls 30—30 of the concave members prevent lateral and longitudinal displacement of the cushions and the inwardly-directed flanges 22—22 prevent lateral displacement of the concave members which are received therebetween. By thus providing means for retaining the resilient metallic liner, I have found that the useful life of the clamp can be substantially increased.

Obviously, the concave members could be constructed to receive the inwardly-directed strap flanges to accomplish the same purpose. In addition, a single concave member would suffice to grip the conduit, with either the two cushions shown or a single cushion providing the resilient lining for the clamp. However, the double members are preferred for ease of assembly.

What I claim as new and novel and desire to secure by Letters Patent is:

1. An improved shock-resistant clamp for a conduit comprising: a bendable metal strap having an arcuate conduit-encircling intermediate portion and a pair of overlying end portions, attachable to a support, extending generally tangentially from said intermediate portion, said strap being of channeled cross-section having inwardly-directed flanges at the edges thereof; conduit-gripping means on the inside of said strap including at least one arcuate member of channeled cross-section; and at least one vibration-absorbing, heat-dissipating resilient metallic cushion adapted to be contained by said arcuate member, said inwardly-directed strap flanges and said arcuate member combining to form a box-like retainer for said resilient cushion to prevent permanent deformation and distortion thereof.

2. An improved shock-resistant clamp for a conduit comprising: a bendable metal strap having an arcuate conduit-encircling intermediate portion and a pair of overlying end portions, attachable to a support, extending generally tangentially from said intermediate portion, said strap being of channeled cross-section having inwardly-directed flanges at the edges thereof; a pair of vibration-absorbing, heat-dissipating, resilient metallic cushions of generally rectangular cross-section adapted to be received between said strap flanges, said cushions having a preformed arcuate configuration; and a pair of concave conduit-gripping members of less diameter than the arcuate intermediate portion of said strap, said concave members being of channeled cross-section having radially-outwardly directed flanges at the edges thereof, which snugly engage said resilient cushions to prevent lateral displacement thereof, said inwardly-directed strap flanges being adapted to partially overlap said concave member flanges to form a box-like retainer for said cushions to prevent permanent deformation and distortion thereof.

3. The improved vibration resistant and heat-dissipating clamp described in claim 2 wherein said preformed arcuate cushions are constructed of a porous metallic foam.

4. An improved shock resistant clamp for a conduit comprising: a bendable metal strap having an arcuate conduit-encircling intermediate portion and a pair of overlying end portions extending generally tangentially therefrom, said strap being of channeled cross-section having an inwardly-directed flange at either edge thereof; a vibration-absorbing, heat dissipating resilient metallic cushion on the inside of said strap; and conduit-gripping means including a concave, five-sided box member opening outwardly of said clamp and receiving said cushion snugly therein, said inwardly-directed strap flanges and said concave box member combining to form a retainer to prevent lateral and longitudinal displacement of said resilient cushion to prevent permanent deformation and distortion thereof.

5. A shock-resistant clamp for a conduit comprising a bendable metal strap having an arcuate, intermediate portion and a pair of overlying end portions extending generally tangentially therefrom, a conduit-gripping means on the inside of said strap forming an opening through which a conduit may pass, said strap and gripping means being relatively movable and shaped as to form at least one box-like space therebetween extending substantially around said opening, and vibration-absorbing means located within said space to cushion a conduit against vibrations transmitted to said clamp.

6. A conduit clamp assembly comprising a metallic strap element including an arcuate intermediate portion adapted to encircle the conduit and overlapped end portions adapted to be secured together after assembly of the strap element over the conduit, a liner element underlying said strap element over at least a major part of its conduit encircling portion, said strap and liner element being relatively movable and complementarily shaped so as to define between them a supbstantially closed space extending circumferentially of their conduit encircling portions, and a body of vibration absorbent material confined within said space between said strap and liner element.

References Cited in the file of this patent
UNITED STATES PATENTS

| | | |
|---|---|---|
| 2,338,031 | Ellinwood | Dec. 28, 1943 |
| 2,790,614 | Miller | April 30, 1957 |

FOREIGN PATENTS

| | | |
|---|---|---|
| 573,704 | Great Britain | Dec. 3, 1945 |